United States Patent

Chin

[11] Patent Number: 6,023,139
[45] Date of Patent: Feb. 8, 2000

[54] BRUSHLESS DC FAN DRIVER WITH AN INTEGRAL OVERALL PROTECTION CAPABILITY

[75] Inventor: Shu-Yuan Chin, Hsin-Chu, Taiwan

[73] Assignee: Tai E International Patent and Law Office, Taipei, Taiwan

[21] Appl. No.: 09/300,372

[22] Filed: Apr. 27, 1999

[51] Int. Cl.[7] .............................. H02P 6/06; H02H 7/093
[52] U.S. Cl. ............................................ 318/434; 318/254
[58] Field of Search .................................. 318/138, 254, 318/434, 439; 361/23, 28

[56] References Cited

U.S. PATENT DOCUMENTS

| | | | |
|---|---|---|---|
| 4,379,984 | 4/1983 | Muller | 318/254 |
| 4,554,491 | 11/1985 | Plunkett | 318/254 |
| 5,289,089 | 2/1994 | Aoki | 318/254 |
| 5,363,024 | 11/1994 | Hiratsuka et al. | 318/254 |

*Primary Examiner*—Bentsu Ro
*Attorney, Agent, or Firm*—Gardere & Wynne, LLP; Sanford E. Warren, Jr.

[57] ABSTRACT

A brushless DC fan driver is disclosed, which includes an amplifier, a pulse generator and a driving unit for rotating a fan, and further includes a tachometer unit, a lock protection unit and an overshoot voltage prevention unit for providing a reliable driving capability. The tachometer unit is provided to present a signal representing the rotation speed of the fan based on an amplified alternative polarity signal from a Hall sensor in the fan. The lock protection unit is provided to detect that the fan is locked up based on the amplified alternative polarity signal thereby generating a lock signal to shut down the fan driver and a restart signal to attempt to restart the locked fan. The overshoot voltage prevention unit is connected to the driving unit for detecting and bypassing overshoot voltages generated by the fan in operation.

6 Claims, 4 Drawing Sheets

BRUSHLESS DC FAN DRIVER WITH AN INTEGRAL OVERALL PROTECTION CAPABILITY

BACKGROUND OF THE INVENTION

1. Field of the Invention

The present invention relates to a brushless DC fan driver, and more particularly, to a brushless DC fan driver having an over voltage prevention circuit, a lock protection circuit and a fan tachometer output to provide a reliable driving capability.

2. Description of Related Art

U.S. Pat. No. 5,289,089 granted to Aoki disclosed a fan motor drive system which employs a fan motor drive circuit to drive a single phase motor (10). The fan motor drive circuit has an amplifier (2) to receive output signals from a Hall element (1) for determining the phase of the rotor in a single phase motor (10) and output the same after amplification. A drive signal generating circuit (3) receives the amplified signal from the amplifier (2), generates first and second pulses (4a, 5a) having a duty cycle of about 50% where the phases differ by about 180 degrees from each other and outputs the same. A first drive circuit (11) is connected to the first terminal (6) of the single phase motor (10), and a second drive circuit (12) is connected to the second terminal (6) of the single phase motor (10), each of the first and second drive circuits (11, 12) includes a first transistor which supplies a current to the single phase motor (10), a second transistor which draws a current from the single phase motor (10) and a diode which bypasses the current flowing out of the single phase motor (10) toward a power source line side.

When the above fan motor drive system is operating, overshoot voltages may be generated on the outputs of the fan motor drive circuit, which will cause gradual damage to the fan motor drive system. Therefore, two diodes (D1,D2) are used to bypass the overshoot voltage to the power source line. However, in some applications, the power source has to be connected in series with a diode to prevent permanent damage caused by faulty connection between VCC and ground. This makes diodes protection useless.

Further, there is no protection for the above fan motor drive system when the fan motor (10) is locked up. The rotation speed of the fan motor (10) is also unknown so that the user is not aware of the operation condition of the fan motor (10) and the rotation of the fan motor (10) can not be properly controlled. Therefore, there is a need for the above fan motor drive circuit to be improved.

SUMMARY OF THE INVENTION

The objective of the present invention is to provide a brushless DC fan driver capable of preventing overshoot voltage, protecting the fan from overheating when rotation is prevented and detecting the rotation speed of the fan.

To achieve the objective, the brushless DC fan driver in accordance with the present invention has an amplifier, a pulse generator and a driving unit for rotating a fan. The amplifier receives an alternative polarity signal from a Hall sensor for determining the phase of the rotor in the fan and outputs the same after amplification. The pulse generator receives the amplified alternative polarity signal to provide two phase-inverted pulse signals. The driving unit is activated by the two phase-inverted pulse signals to generate two phase-inverted drive signals at two output terminals of the driving unit for driving said fan. A tachometer unit is provided to present a signal representing the rotation speed of the fan based on the amplified alternative polarity signal. A lock protection unit is provided to detect when the fan is locked up (prevented from rotating) based on the amplified alternative polarity signal thereby generating a lock signal to shut down the fan driver and a restart signal to attempt to restart the locked fan. An overshoot voltage prevention unit is connected to the output terminals of the driving unit for detecting and bypassing overshoot voltages generated by the fan in operating.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
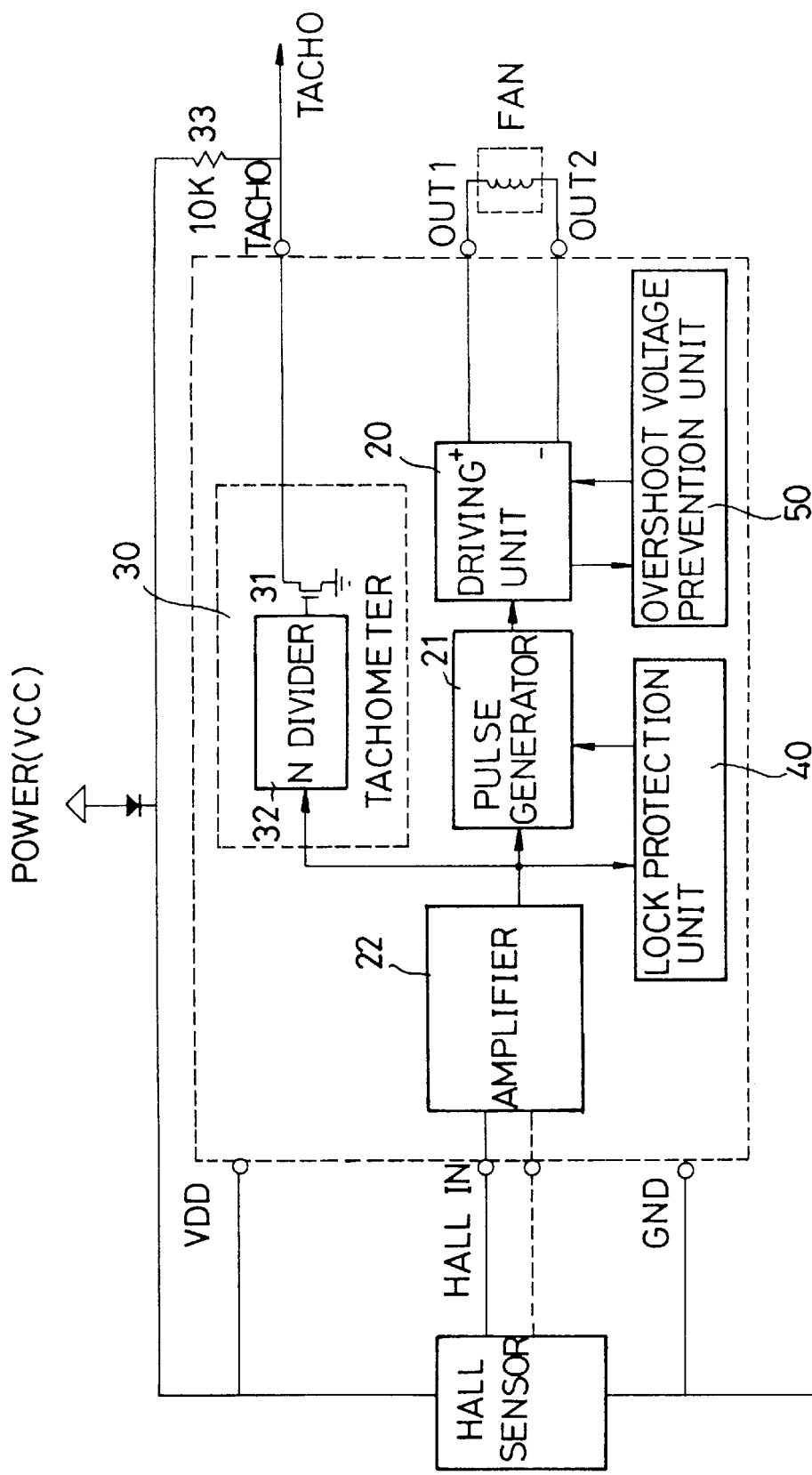
FIG. 1 is a schematic diagram of a DC fan driver in accordance with the present invention.

As shown in FIG. 1, a DC fan driver in accordance with the present invention includes an amplifier (22) (or a buffer), a pulse generator (21) and a driving unit (20) for rotating a fan, and further includes a tachometer unit (30), a lock protection unit (40) and an overshoot voltage prevention unit (50) for providing a reliable driving capability.

The amplifier (22) receives an alternative polarity signal from a Hall sensor for determining the phase of the rotor (not shown) in the fan and outputs the same after amplification. The amplifier (22) can be replaced with a buffer if a Hall IC is used to detect the phase of the fan rotor.

The pulse generator (21) has an input connected to the amplifier for receiving the amplified alternative polarity signal to provide two phase-inverted pulse signals to the driving unit (20).

The driving unit (20) can be implemented with two sets of driving circuits to generate two phase-inverted drive signals at two output terminals OUT1 and OUT2, respectively, thereby driving the fan.

The tachometer unit (30) is provided to sense the rotation speed of the fan so that the rotation of the fan can be properly controlled. The tachometer (30) includes a transistor (31) and a divider (32), wherein the transistor (31) can be a NPN transistor, PNP transistor or a field effect transistor. In the preferred embodiment shown, transistor 31 is a field effect transistor with its drain connected to VDD via a resistor (33) and gate connected to the output of the divider (32). The input of the divider (32) is connected to the output of the amplifier (22) so that the divider (32) receives the amplified alternative polarity signal whose frequency is proportional to the rotation speed of the fan and divides the frequency of the amplified alternative polarity signal by n. The output of the divider (32) is connected to the gate of transistor 31 whereby the drain of transistor 31 is defined to be a tachometer terminal (TACHO) for providing a well known signal representing the rotation speed of the fan. Accordingly, the operational condition of the fan can be ascertained and the rotation of the fan can be dynamically controlled based on the TACHO signal.

The value of n in the divider (32) depends on the number of poles in the fan. The frequency of the alternative polarity signal is 2n×33 actual rotation speed, where 2n is the number of poles in the fan. Therefore, when a fan with 6 poles is employed, n is equal to 3.

Figure 2:
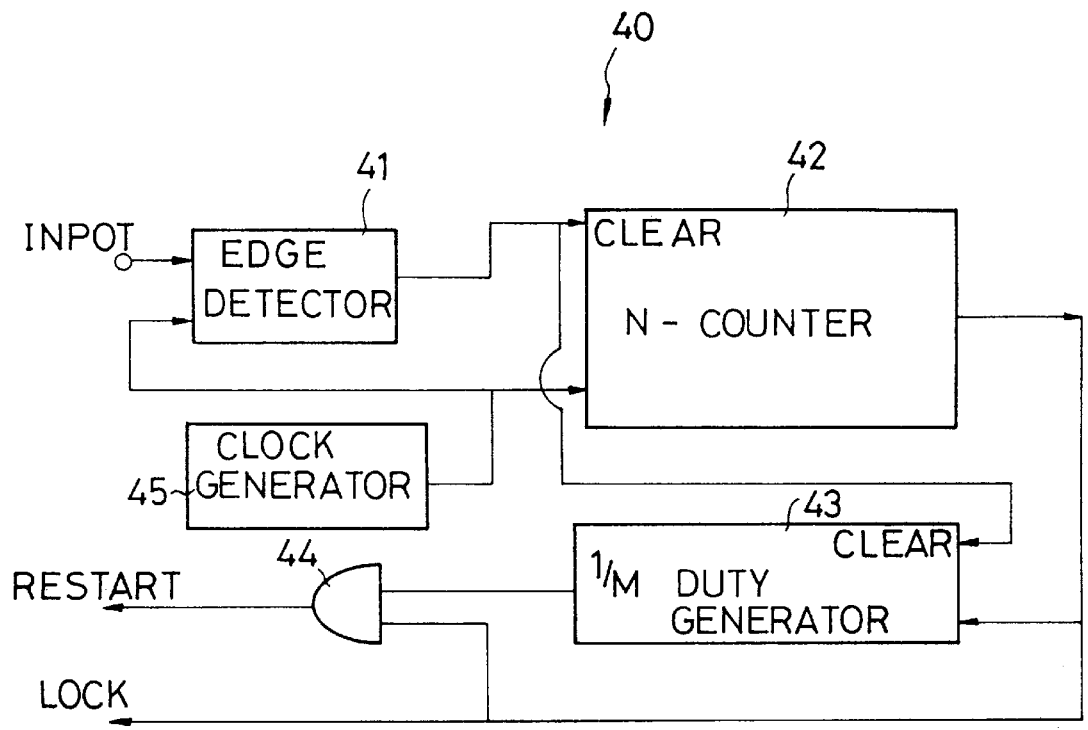
FIG. 2 is a schematic diagram of the lock protection unit of the DC fan driver in accordance with the present invention.

The lock protection unit (40) is provided to detect that the fan is locked up and to attempt to restart the locked fan. FIG. 2 is a schematic diagram showing the lock protection unit (40) which includes an edge detector (41), an N-counter (42), a 1/M-duty generator (43), a logic gate and a clock generator (45). The clock generator (45) can be implemented with an oscillator to provide a proper clock signal to the edge detector (41) and the N-counter (42). The edge detector (41) detects the edge of the amplified alternative polarity signal from the amplifier (22) to clear the N-counter (42) and 1/M-duty generator (43) when an edge is sensed. After being cleared, the N-counter (42) starts to count for a preset period of time which might be one or two seconds to make sure that the fan is locked up before generating a lock signal which is applied to the 1/M duty generator and also used to shut down the fan driver. The logic gate (44) is provided to process a logic operation of the lock signal and the output signal of the 1/M-duty generator (43) thereby generating a restart signal to attempt to restart the fan.

In this preferred embodiment, the logic gate (44) is an AND gate so that when both the lock signal of the N-counter (42) and the output signal of the 1/M duty generator (43) are high, an active high restart signal lasting for a preset period of time is generated and transmitted to the pulse generator (21) to restart the fan. The preset period of time that the restart signal remains high is equal to the high duration of the lock signal divided by M. If the fan is locked up due to a slight mechanical disorder, the fan can be restarted as described above. However, the active lock signal has to be reported to the user so that proper remedial action can be taken.

Figure 3:
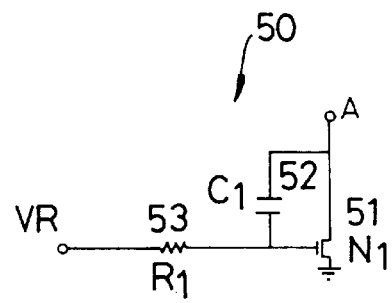
FIG. 3 is a circuit diagram of the overshoot voltage prevention unit of the DC fan driver in accordance with the present invention.
Figure 4:
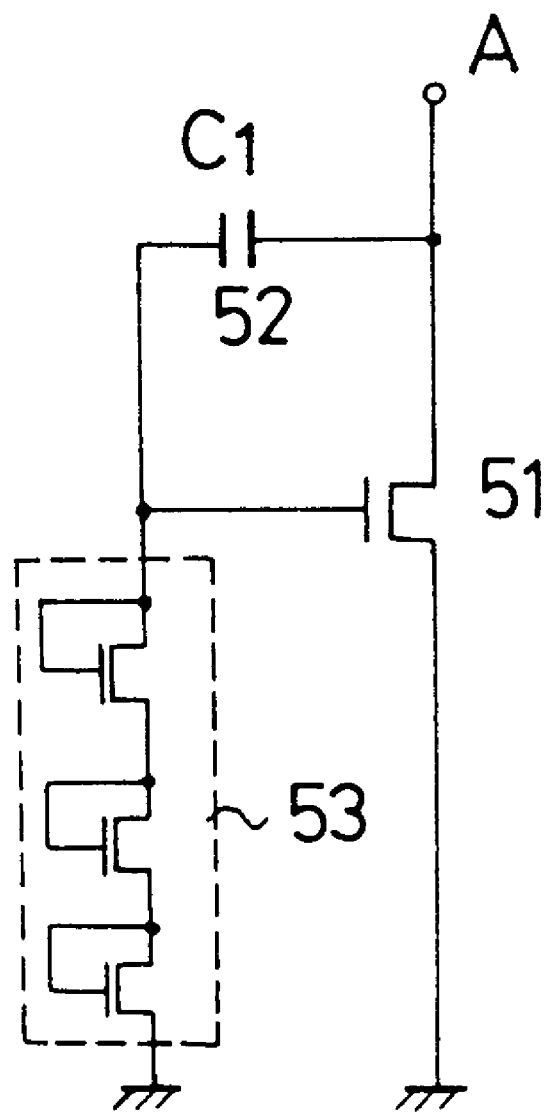
FIG. 4 is another circuit diagram of the overshoot voltage prevention unit of the DC fan driver in accordance with the present invention.

The overshoot voltage prevention unit (50) is provided to bypass the overshoot voltage generated by the fan during operation thereby protecting the fan driver from being damaged. As shown in FIG. 3, the circuit diagram of the overshoot prevention unit (50) includes a resistor (R1), a capacitor (C1) and a MOS transistor (N1) with its drain connected to the output terminals OUT1 and OUT2 of the driving unit (20). Resistor R1 is connected between a reference voltage VR and the gate of transistor N1. The reference voltage VR is related to VDD and provides a proper DC bias to the gate of transistor N1. Capacitor C1 is used to couple the voltage from node A to the gate of N1 in the transient state. Resistor R1 is used to hold the coupled voltage for a period of time to turn on transistor N1 and bypass the over current caused by changing the fan driver's output states so that the overshoot voltages at node A can be prevented Resistor R1 can also be replaced with multiple MOS transistors connected in series as shown in FIG. 4.

Figure 5:
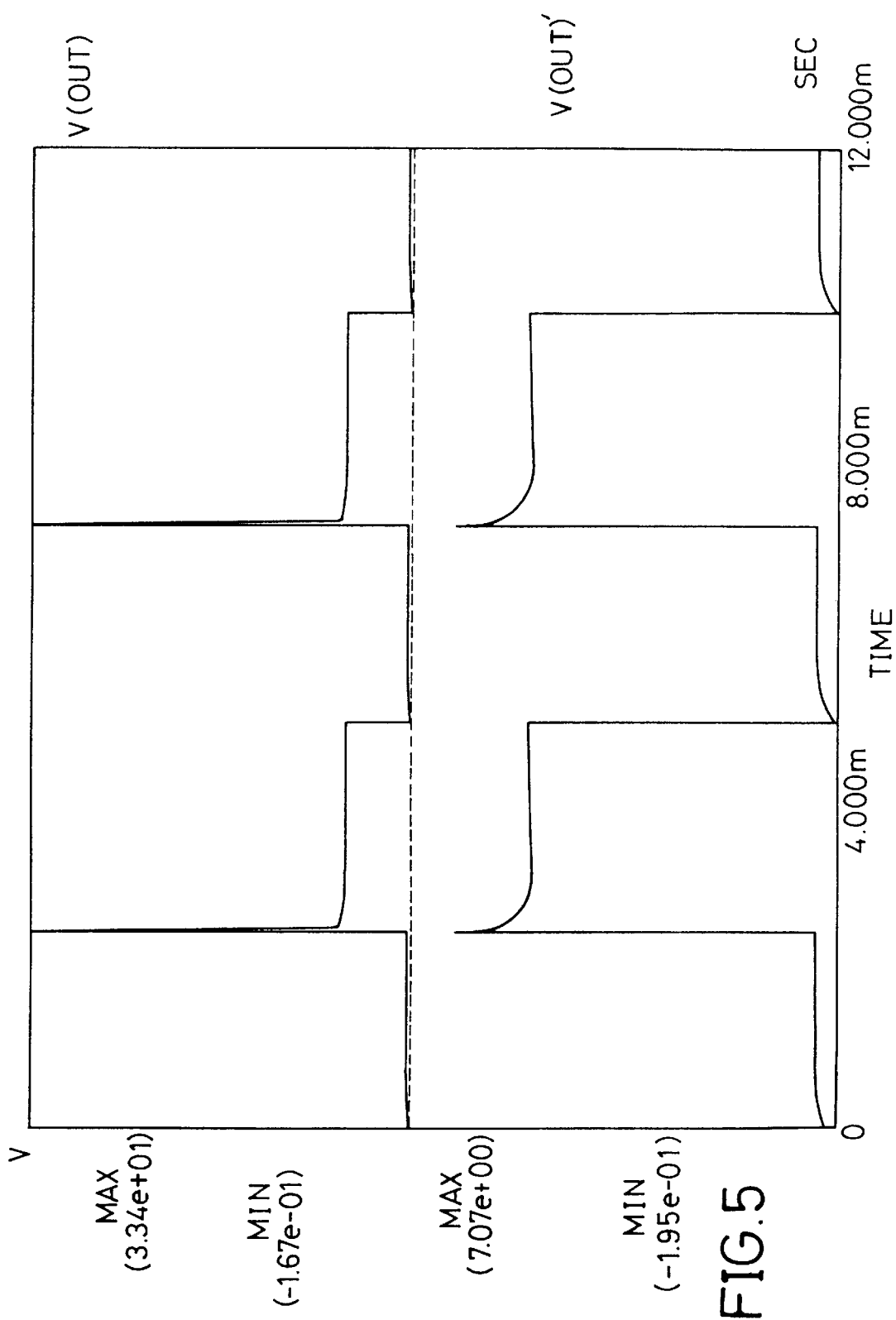
FIG. 5 is a SPICE simulation showing the output waveforms of a conventional fan driver and the fan driver in accordance with the present invention.

FIG. 5 is a SPICE simulation showing that the output voltage V(OUT1) could overshoot more than 25V if the fan driver is not provided with an overshoot voltage prevention arrangement. However, the overshoot voltage in the output voltage V(OUT1) ' is smaller than 1V if the fan driver in accordance with the present invention is provided.

Although the present invention has been explained in relation to its preferred embodiment, it is to be understood that many other possible modifications and variations can be made without departing from the spirit and scope of the invention as hereinafter claimed.

What is claimed is:

1. A brushless DC fan driver with an integral overall protection capability comprising:

an amplifier (22) to receive an alternative polarity signal from a Hall sensor for determining the phase of a rotor in a fan and output the same after amplification;

a pulse generator (21) to receive said amplified alternative polarity signal to provide two phase-inverted pulse signals;

a driving unit (20) activated by said two phase-inverted pulse signals to generate two phase-inverted drive signals at two output terminals (OUT1, OUT2) of said driving unit (20) for driving said fan;

a tachometer unit (30) having a divider (32) and a transistor (31), said divider (32) having an input for receiving said amplified alternative polarity signal and dividing the frequency of said amplified alternative polarity signal and an output connected to said transistor (31) for providing a tachometer signal representing the rotation speed of the fan;

a lock protection unit (40) for receiving said amplified alternative polarity signal and detecting that said fan is locked up to generate a lock signal to shut down said fan driver and a restart signal to attempt to restart the locked fan; and an overshoot voltage prevention unit (50) connected to said two output terminals (OUT1, OUT2) of said driving unit (20) for detecting and bypassing overshoot voltages generated by said fan in operating.

2. The brushless DC fan driver as claimed in claim 1, wherein said transistor (31) of said tachometer (30) is a field effect transistor with its drain connected to a power source via a resistor (33) and its gate connected to the output of said divider such that said tachometer signal is present at the drain of said transistor (31).

3. The brushless DC fan driver as claimed in claim 1, wherein said lock protection unit (40) comprising:

- an edge detector (41) for detecting an edge of said amplified alternative polarity signal from said amplifier (22);
- a counter (42) which is cleared when an edge is detected by said edge detector (41) and starts to count for a preset period of time thereby generating said lock signal if said fan is locked up;
- a duty generator (43) which is cleared when an edge is detected by said edge detector (41) and receives said lock signal to generate an output signal; and
- a logic gate (44) for processing a logic operation on said lock signal and said output signal to generate a restart signal to attempt to restart said fan.

4. The brushless DC fan driver as claimed in claim 3, wherein said logic gate (44) is an AND gate.

5. The brushless DC fan driver as claimed in claim 1, wherein said overshoot voltage prevention unit (50) comprising:

- a MOS transistor (N1) with its drain connected to said output terminals (OUT1, OUT2) of said driving unit (20);
- a resistor (R1) connected between a reference voltage VR and the gate of said MOS transistor (N1); and
- a capacitor (C1) connected between the drain and gate of said MOS transistor (N1).

6. The brushless DC fan driver as claimed in claim 5, wherein said resistor (R1) can be replaced with multiple MOS transistors (53) connected in series.

* * * * *

UNITED STATES PATENT AND TRADEMARK OFFICE
CERTIFICATE OF CORRECTION

PATENT NO.   : 6,023,139
DATED        : February 8, 2000
INVENTOR(S)  : Shu-Yuan Chin It is certified that error appears in the above-identified patent and that said Letters Patent is hereby corrected as shown below:

<u>Title page,</u>
Item [73], please change Assignee information to read as follows:
--Silicon Touch Technology, Inc.
8-2 Fl., Chien-HSIN Road
HSIN-CHU, Taiwan R.O.C.

Signed and Sealed this

Seventeenth Day of December, 2002

*JAMES E. ROGAN*
*Director of the United States Patent and Trademark Office*